United States Patent [19]

Sapers

[11] Patent Number: 5,019,405

[45] Date of Patent: May 28, 1991

[54] PROCESS FOR MANUFACTURER OF NON-BLEEDING MARASCHINO CHERRIES

[75] Inventor: Gerald M. Sapers, Warrington, Pa.

[73] Assignee: The United States of America as represented by the Secretary of Agriculture, Washington, D.C.

[21] Appl. No.: 608,919

[22] Filed: Nov. 5, 1990

[51] Int. Cl.$^5$ .............................................. A23L 1/275
[52] U.S. Cl. .................................. 426/250; 426/540; 426/639
[58] Field of Search ...................... 426/250, 540, 639

[56] References Cited

U.S. PATENT DOCUMENTS

| | | | |
|---|---|---|---|
| 3,336,141 | 8/1967 | Frickes | 426/250 |
| 3,483,002 | 12/1969 | Stein | 426/250 |
| 3,734,747 | 5/1973 | De Felice | 426/250 |
| 3,886,294 | 5/1975 | Emodi | 426/540 |
| 3,930,034 | 12/1975 | Shanbhay | 426/250 |
| 4,156,023 | 5/1979 | Jessen et al. | 426/250 |
| 4,851,339 | 7/1989 | Hills | 435/67 |

OTHER PUBLICATIONS

Duxbury, D. D., Food Processing, May, 1990, pp. 63–70.

*Primary Examiner*—Jeanette Hunter
*Attorney, Agent, or Firm*—David R. Sadowski; M. Howard Silverstein

[57] ABSTRACT

A method for dyeing a food by displacing water contained in the food with ethyl alcohol, placing the alcohol treated food into a solution of a dye soluble in alcohol but insoluble in water and allowing the dye to equilibrate within the treated food and subsequently displacing the alcohol in the dyed food with water leaving the dye in the food.

9 Claims, No Drawings

PROCESS FOR MANUFACTUR OF NON-BLEEDING MARASCHINO CHERRIES

BACKGROUND OF THE INVENTION

1. Field of Invention

This invention relates to the manufacture of maraschino cherries in a dyeing process using carotenoids. The process renders cherries non-bleeding, and as such they are incapable of leaking colorant into aqueous foodstuffs such as fruit cocktail and fruit salad to which cherries are added.

2. Description of the Prior Art

Maraschino cherries are manufactured from sweet cherries after preparation and bleaching by storage in a strong bisulfite brine. In certain instances cherries may be subjected to secondary bleaching processes with sodium chlorite to remove blemishes. The resulting bleached cherries are leached to remove essentially all of the sulfite prior to coloring with an artificial dye. Conventional maraschino cherries are dyed with FD & C Red No. 40, a water soluble dye that is added to the syrup in which the fruit is packed.

Water soluble pigments in beets (betalaines), cranberries (anthocyanins), and tart cherries (anthocyanins) have been proposed as alternative colorants for this product (U.S. Pat. No. 4,115,595, T. Volpe, Food Product Development 10(9): 13-14 (1976); M. R. McLellan and J. N. Cash, J. Food Sci. 44:483-487 (1979)). Non-bleeding maraschino cherries, used in fruit cocktails and salads where leakage of color into the syrup or juice would be unsightly, are dyed with FD & C Red No. 3 (Erythrocin), applied to the leached fruit as a neutral solution. When the cherries are acidified, the dye precipitates and remains fixed within the fruit tissue so that bleeding cannot occur as long as the cherries are in an acidic medium. Recent action taken by the U.S. Food and Drug Administration against some uses of Red No. 3, a suspected carcinogen, has thrown into question the future use of this dye as a cherry colorant. If Red No. 3 should be banned in cherries, the water soluble alternatives would be of no value as replacement colorants. Only one approved food colorant is being considered by the industry as a replacement for Red No. 3, carmine, the aluminum lake of carminic acid, which is derived from cochineal, the dried body of a female insect (*Dactylopius coccus costa*) (D. D. Duxbury, Food Processing 51(5): 63-70 (1990)).

This colorant, which is applied to the fruit as an alkaline solution and is fixed in the tissue by pH reduction, is expensive, difficult to apply, may vary in color uniformity, and lacks Kosher certification. Furthermore, the dyed fruit may show variation in color and bleeding under some circumstances.

A Japanese patent calls for the use of boiled pimiento as a substitute for maraschino cherries in fruit jelly where color bleeding would be undesirable (Q. P. Corp., Japan Pat. No. 60,027,346, Feb. 12, 1985). However, an alternative means of producing a non-bleeding maraschino-type cherry product, that is not subject to the disadvantages of carmine, would be highly desirable.

SUMMARY OF THE INVENTION

The present invention imparts the desirable property of non-bleedability to maraschino cherries by using one or more natural carotenoid pigments as the colorant. Such pigments are largely insoluble in aqueous systems, and if infiltrated into the cherry tissue, remain fixed and cannot diffuse into the syrup or juice to which the dyed cherries are added. Because of their insolubility in water, such pigments cannot be applied to the cherries directly. Essential elements of this invention are use of an edible, water-miscible solvent such as ethanol as a carrier of the pigment(s), and the replacement of water in the cherry tissue with the same solvent prior to infiltration. Once the pigment(s) is uniformly distributed throughout the fruit at a concentration sufficient to produce an acceptable color, the non-aqueous solvent in the cherry tissue is displaced with water, causing the pigment(s) to precipitate and become fixed. Various carotenoids, particularly red carotenoids such as canthaxanthin, capsanthin (and its esters), or lycopene may be employed as colorants, singly or combination, depending on the hue desired.

In addition to being water-insoluble and therefore non-bleeding, the carotenoid pigments have the advantage of being easier to apply to cherries than carmine or Red No. 3, compatible with the natural acidity of the cherry fruit, and more stable than the betalaine or anthocyanin pigments. Furthermore, such pigments are readily available, uniform, natural, safe and therefore unlikely to be subject to future regulatory restrictions, and compatible with Kosher certification.

DETAILED DESCRIPTION OF INVENTION

The novel dyeing process may be applied to single or secondary bleached cherries with comparable results. The cherries are leached conventionally with sufficient water to reduce their sulfur dioxide content below 25 ppm; 5-6 changes in water are required for leaching when a ratio of fruit to water between 1.65:1 and 2.5:1 is used. The leached fruit is then soaked in successive portions of ethanol (anhydrous or 95%) until the ethanol concentration in the equilibrated mixture, determined with a hydrometer, exceeds 90%. With anhydrous ethanol, this requires 3 changes of ethanol when a ratio of fruit to ethanol of 2.5:1 is used.

The time required for leaching and displacement of tissue water with ethanol depends on the efficiency of mixing and temperature but should not exceed 3-4 days. The ethanolic cherries are dyed with an ethanolic solution of one or more carotenoid pigments, derived synthetically or from natural products. Among the carotenoids that may be used are canthaxanthin, a synthetic carotenoid also found naturally in certain algae (H. T. Gordon, Current Aspects of Food Colorants, Ch. 4, CRC Press, Cleveland) and the mixture of capsanthin and capsanthin esters found in paprika oleoresin (T. Philip, J. Food Sci. 36:98-100 (1971). The carotenoids in pimientos, red bell peppers and tomatoes also may be used to color cherries. Water dispersible forms of canthaxanthin and paprika oleoresin are commercially available for use in coloring aqueous food products such as sauces, salad dressings, beverages, cakes, simulated meats, soup mixes, and the like. However, aqueous dispersions of the carotenoid pigments are incapable of penetrating into the tissues of cherry fruit, even after prolonged soaking, resulting in little or no coloration of the product. The successful use of such pigments to dye cherries represents an unexpected and unobvious result.

The color of cherries dyed with carotenoids depends largely on the strength of the ethanolic pigment solution. An acceptable cherry color will result if the pigment solution used for dyeing has an absorbance between 0.8 and 1.6 at 466–474 nm, when diluted 1:50 with ethanol. With canthaxanthin, this corresponds to a pigment content in the fruit between 0.068 and 0.136%. Canthaxanthin is currently available only in water dispersible form and must be extracted from the gelatin matrix in which it is marketed before an ethanolic solution can be prepared. This can be done with a solvent of intermediate polarity such as chloroform-methanol (1:1). The canthaxanthin extract is filtered, evaporated to dryness under nitrogen, and redissolved in ethanol. When an ethanol-soluble form of canthaxanthin becomes available the aforementioned extraction and solvent removal steps would not be required, and an ethanolic dyeing solution could be prepared directly. Ethanolic solutions of paprika oleoresin can be made directly.

The cherries are infiltrated with pigment solution for 4–7 days at ambient temperature (ca. 20°), the dyeing time depending on the pigment concentration and ratio of fruit to solution. More rapid dyeing is possible at a higher temperature and with better mixing.

After dyeing, the carotenoid solution is drained and replaced with 5–7 changes of water (cherries to water=ca. 1:3) over 1–2 days to displace the ethanol and fix the pigments within the cherry tissue. Very little pigment is extracted from the cherries during this operation. When the ethanol concentration has been lowered below 2%, the cherries can be packed in water or syrup and pasteurized, as is practiced conventionally. The dyed cherries are red or orange-red in color, single bleached cherries appearing slightly lighter than secondary bleached fruit given the same treatment. The color of the cherry surface and interior tissues is relatively uniform, and the epidermis retains a natural gloss. The dyed cherries will not bleed or undergo obvious changes in appearance or structure when added to fruit cocktail and heated.

Ethanol may be recovered from dilute solutions generated during the displacement of tissue water prior to dyeing and during alcohol displacement after pigment infiltration by means of distillation.

The recovered ethanol may be used to repeat the displacement process or to prepare carotenoid solutions for dyeing. Spent carotenoid solutions may be fortified with additional pigments or concentrated by reverse osmosis to restore their concentration to that required for dyeing cherries. The process of the invention is further demonstrated by the following examples which are intended only to further illustrate the invention and not to limit the scope of the invention, as defined by the claims.

EXAMPLE 1

Samples of single and secondary bleached cherries (pitted) weighing 100 g were leached with water to reduce the sulfite content below 25 ppm, determined by iodometric titration. The cherries were soaked in 3 successive 250 mL portions of absolute ethanol over 3 days to displace tissue water and then infiltrated with 250 mL ethanol containing 0.5% paprika oleoresin for 2 days. The absorbance of colorant solution, drained from the cherries and diluted 1:50 with ethanol, was 0.797 at 474 nm, measured with a diode array UV-visible spectrophotometer.

The cherries were soaked in 7 successive 250 mL portions of water to displace the ethanol and fix the pigments. The dyed cherries were packed in a 40° Brix syrup to which additional sucrose was added so that the final sucrose concentration was 40° Brix, measured by refractometry.

EXAMPLE 2

An ethanolic solution of canthaxanthin was prepared by extracting 30 g of water dispersible powder (containing 10% pigment) with 400 mL chloroform-methanol (1:1) for 2 hours. The suspension was filtered through a medium porosity fritted funnel, and the insoluble residue was re-extracted with 2 additional 200 mL portions of solvent, removing essentially all color from the residue. The filtrates were pooled, heated on a steam bath under a nitrogen stream in a fume hood to evaporate most of the solvent, and then held under vacuum at room temperature to remove residual solvent. The extracted pigments were dissolved in 360 mL ethanol.

Samples of single and secondary bleached cherries weighing 200 g were leached with water to remove sulfite and soaked in ethanol to displace tissue water, as described in Example 1.

Each sample of ethanolic cherries was drained and infiltrated with 180 mL of canthaxanthin solution for 5 days at ambient temperature. The absorbance of the colorant solution, drained from the cherries and diluted 1:100 with ethanol, was 0.706 at 466 nm. The dyed cherries were soaked in 6 successive 2-L portions of water to displace the ethanol and fix infiltrated canthaxanthin. The cherries were then packed in 40° Brix syrup, as described in Example 1.

EXAMPLE 3

Two single bleached and secondary bleached cherries, dyed with canthaxanthin as described in the preceding example, were each quartered and placed in duplicate 200 g portions of commercial fruit cocktail from which the original maraschino cherries had been removed. Each sample was heated on a hot plate with frequent mixing until a temperature of 95° C. was attained after 25 minutes. The samples were then held at ambient temperature for 1 hour, during which time the product temperature gradually decreased to 40°–43° C. The appearance of the cherries, syrup and adjacent fruit was carefully observed during heating and cooling. No indications of color bleeding were seen with either cherry sample. Furthermore, the cherry pieces appeared undamaged, and the epidermis retained its normal gloss following this treatment.

EXAMPLE 4

A spectrocolorimeter was used to compare the color of commercial maraschino cherries, commercial non-bleeding cherries dyed with Red No. 3, experimental cherries dyed with canthaxanthin and experimental cherries dyed with paprika oleoresin. Values of L, a, b, and the hue angle, determined under C-illumination, were obtained for 4 cherries from each sample, by placing the individual cherries over a 10 mm aperture at the sample port. The results of this comparison are summarized in Table 1.

TABLE 1

| Sample | Mean Value | | | Hue Angle |
|---|---|---|---|---|
| | L | a | b | |
| Maraschino cherry: | 25.75 | 21.31 | 7.61 | 19.6 |
| Non-bleeding, Red No. 3: | 30.54 | 28.74 | 5.74 | 11.3 |
| Canthaxanthin, single bleach: | 23.87 | 15.53 | 7.03 | 24.4 |
| Canthaxanthin, | 23.29 | 13.06 | 6.17 | 25.3 |

TABLE 1-continued

| Sample | Mean Value | | | Hue Angle |
|---|---|---|---|---|
| | L | a | b | |
| secondary bleach: | | | | |
| Paprika oleoresin, single bleach: | 24.40 | 16.18 | 8.66 | 28.2 |
| Paprika oleoresin, secondary bleach: | 23.39 | 11.68 | 5.99 | 27.2 |

These tristimulus values indicate that the experimental non-bleeding cherries are more like commercial maraschino cherries than the conventional non-bleeding cherries dyed with Red No. 3.

It can be seen there that there has been provided in accordance with the present invention methods for the production of colored agricultural commodities.

The invention as described by the specific embodiments is not meant to limit its scope. It is envisioned and apparent that numerous alternatives and variations can be practiced from these teachings, and it is understood that such variations are within the scope of the appended claims.

I claim:

1. A method for dyeing a food commodity comprising:
   (a) displacing water contained in a food commodity with ethyl alcohol to form an alcohol treated food commodity,
   (b) placing said treated food commodity into an ethyl alcohol solution of a dye soluble in alcohol but insoluble in water and allowing said dye to equilibrate within the treated food commodity and alcoholic dye solution to form a dyed food commodity, and
   (c) displacing the alcohol in the dyed food commodity with water while leaving said dye contained in the dyed food commodity.

2. The method of claim 1, wherein the dye is a carotenoid.

3. The method of claim 2, wherein the carotenoid is a red colored carotenoid.

4. The method of claim 2, wherein the carotenoid is selected from the group consisting of lycopene, canthaxananthin, capsanthin, capsanthin esters and mixtures thereof.

5. A dyed food commodity prepared by the method of any one of claims 1, 2, 3, or 4.

6. The dyed food commodity of claim 5 wherein the food is a fruit, grain or vegetable.

7. The dyed food commodity of claim 6, wherein the food is a fruit.

8. The dyed food commodity of claim 7, wherein the fruit is a cherry.

9. The dyed food commodity of claim 8, wherein the cherry is brine treated.

* * * * *